United States Patent
Griffin et al.

(10) Patent No.: US 7,072,941 B2
(45) Date of Patent: Jul. 4, 2006

(54) SYSTEM AND METHOD FOR CHAT BASED COMMUNICATION MULTIPHASE ENCODED PROTOCOL AND SYNCRHONIZATION OF NETWORK BUSES

(75) Inventors: Chris Michael Griffin, Naperville, IL (US); Bashar Jano, Algonquin, IL (US); Jin Woo Lee, Vernon Hills, IL (US); Mihaela Kamenova Mihaylova, Schaumburg, IL (US); Christopher Robert Dale Wilson, Carpentersville, IL (US)

(73) Assignee: fastmobile, Inc., Rolling Meadows, IL (US)

( * ) Notice: Subject to any disclaimer, the term of this patent is extended or adjusted under 35 U.S.C. 154(b) by 0 days.

(21) Appl. No.: 10/245,918

(22) Filed: Sep. 18, 2002

(65) Prior Publication Data

US 2004/0015547 A1 Jan. 22, 2004

Related U.S. Application Data

(63) Continuation-in-part of application No. 10/197,022, filed on Jul. 17, 2002.

(51) Int. Cl.
*G06F 15/16* (2006.01)
(52) U.S. Cl. .................................... 709/204
(58) Field of Classification Search ............... 709/204, 709/205, 206; 345/753, 758, 778, 780, 785, 345/792, 793, 864; 455/3.01
See application file for complete search history.

(56) References Cited

U.S. PATENT DOCUMENTS

| | | | | |
|---|---|---|---|---|
| 5,528,671 A | | 6/1996 | Ryu et al. ..................... 379/93 |
| 5,694,549 A | * | 12/1997 | Carlin et al. ................ 709/250 |
| 5,742,905 A | * | 4/1998 | Pepe et al. .................... 455/461 |
| 5,838,318 A | * | 11/1998 | Porter et al. ................ 715/790 |
| 5,889,764 A | * | 3/1999 | Needham et al. ........... 370/263 |
| 5,905,476 A | * | 5/1999 | McLaughlin et al. ....... 715/781 |
| 5,987,401 A | * | 11/1999 | Trudeau ........................ 704/2 |
| 5,987,503 A | * | 11/1999 | Murakami ................. 709/204 |
| 5,990,887 A | * | 11/1999 | Redpath et al. ............. 715/758 |
| 5,991,796 A | * | 11/1999 | Anupam et al. ............ 709/206 |
| 6,020,884 A | * | 2/2000 | MacNaughton et al. .... 345/747 |
| 6,061,716 A | | 5/2000 | Moncreiff .................... 709/205 |
| 6,078,948 A | | 6/2000 | Podgorny et al. ........... 709/204 |

(Continued)

FOREIGN PATENT DOCUMENTS

EP 1 154 666 A2 11/2002

(Continued)

OTHER PUBLICATIONS

PCT International Search Report for PCT/US03/22355 dated Sep. 26, 2003.

*Primary Examiner*—William C. Vaughn, Jr.
(74) *Attorney, Agent, or Firm*—Gavrilovich, Dodd & Lindsey LLP

(57) ABSTRACT

A system and method for providing chat group services to wireless mobile terminals is disclosed. The chat forum permits integrated voice and text messaging. The system includes plural mobile terminals, each being capable of running a chat client application. A server complex is connected to one or more wireless carrier networks by way of a packet-based network, such as the Internet. The server complex includes server applications and components for supporting the chat group services and communicating with the chat clients on the mobile terminals. The system also includes features that permit the integration of legacy mobile terminals, communication with machine interfaces using a chat metaphor, and robustness and reliability of operation across various wireless operators.

18 Claims, 9 Drawing Sheets

U.S. PATENT DOCUMENTS

| | | | |
|---|---|---|---|
| 6,157,814 A * | 12/2000 | Hymel et al. | 340/7.56 |
| 6,161,134 A * | 12/2000 | Wang et al. | 709/220 |
| 6,212,548 B1 * | 4/2001 | DeSimone et al. | 709/204 |
| 6,286,034 B1 | 9/2001 | Sato et al. | 709/204 |
| 6,301,609 B1 | 10/2001 | Aravamudan et al. | 709/207 |
| 6,370,563 B1 * | 4/2002 | Murakami et al. | 709/205 |
| 6,430,567 B1 * | 8/2002 | Burridge | 707/102 |
| 6,446,112 B1 * | 9/2002 | Bunney et al. | 709/204 |
| 6,456,621 B1 * | 9/2002 | Wada et al. | 370/389 |
| 6,459,892 B1 * | 10/2002 | Burgan et al. | 455/412.1 |
| 6,480,885 B1 * | 11/2002 | Olivier | 709/207 |
| 6,499,053 B1 * | 12/2002 | Marquette et al. | 709/204 |
| 6,539,421 B1 * | 3/2003 | Appelman et al. | 709/206 |
| 6,549,768 B1 * | 4/2003 | Fraccaroli | 455/456.3 |
| 6,594,255 B1 * | 7/2003 | Neuman | 370/352 |
| 6,630,944 B1 * | 10/2003 | Kakuta et al. | 345/758 |
| 6,677,976 B1 * | 1/2004 | Parker et al. | 348/14.08 |
| 6,721,784 B1 * | 4/2004 | Leonard et al. | 709/206 |
| 2001/0031635 A1 * | 10/2001 | Bharatia | 455/432 |
| 2001/0042095 A1 | 11/2001 | Kim et al. | 709/204 |
| 2002/0022954 A1 | 2/2002 | Shimohata et al. | 704/3 |
| 2002/0023128 A1 | 2/2002 | Matsumoto et al. | 709/204 |
| 2002/0083035 A1 * | 6/2002 | Pearl et al. | 707/1 |
| 2002/0133547 A1 * | 9/2002 | Lin | 709/204 |
| 2003/0003953 A1 * | 1/2003 | Houplain | 455/553 |
| 2003/0007464 A1 * | 1/2003 | Balani | 370/310 |
| 2003/0012348 A1 * | 1/2003 | Skladman et al. | 379/88.13 |
| 2003/0158902 A1 * | 8/2003 | Volach | 709/206 |
| 2003/0236823 A1 * | 12/2003 | Patzer et al. | 709/203 |

FOREIGN PATENT DOCUMENTS

| | | |
|---|---|---|
| JP | 10154117 | 6/1998 |
| JP | 11203227 | 7/1999 |
| JP | 11249990 | 9/1999 |
| JP | 2002009819 | 1/2002 |

* cited by examiner

600 →

| | |
|---|---|
| List Type: GROUP | ← 601 |
| No Groups: 1 | ← 602 |
| Group Name: my buddies | ← 603 |
| Recipient IDs: 412, 321, 864 | ← 604 |
| No Ungrouped: 2 | ← 605 |
| Recipient IDs: 123,104 | ← 606 |
| Recipient ID: 412 | ← 502 |
| Recipient Name: Jane Smith | ← 503 |
| Recipient Nickname: Jane | ← 504 |
| Recipient Short Name: JS | ← 505 |
| Recipient Status: Available | ← 607 |
| ... | |

| ID | Status: | Address | Public Nickname | Public Short Name | Subscriber IDs |
|---|---|---|---|---|---|
| 123 | Available | 123 210 12 112 2016 | JimJ | JJ | 120, 415, 654 |
| 136 | Off | 113 10 112 10 8012 | Chris | CC | 345, 246, 235, 346 |
| 876 | TextOnly | 123 10 112 10 7291 | JaneT | JT | 102, 349 |
| ... | | | | | |

701 → ID, 702 → Status, 703 → Address, 704 → Public Nickname, 705 → Public Short Name, 706 → Subscriber IDs

FIG. 7

SYSTEM AND METHOD FOR CHAT BASED COMMUNICATION MULTIPHASE ENCODED PROTOCOL AND SYNCRHONIZATION OF NETWORK BUSES

This application is a continuation-in-part of U.S. patent application Ser. No. 10/197,022; filed on Jul. 17, 2002 and entitled "Voice and Text Group Chat Display Management Techniques for Wireless Mobile Terminals", which is hereby incorporated by reference.

TECHNICAL FIELD

The present invention relates generally to communication systems incorporating speech and textual input and output modalities and, in particular, to a wireless system for permitting real-time speech and text conversations (e.g., chat threads) on mobile units.

BACKGROUND OF THE INVENTION

Text and, to a lesser degree, speech chatting systems, are generally known in the art, particularly in relation to personal computing systems. Published U.S. Patent Application Nos. 2001/0042095 A1; 2001/0011293 A1; and 2002/0023128 A1 and U.S. Pat. Nos. 6,212,548 and 6,286,034 illustrate exemplary system and user interfaces used today. A common feature of such systems is that the various conversations (or threads) are usually split out into distinct regions (or windows) on the display or screen. Furthermore, when a single thread comprises a plurality of both text and speech exchanges, such systems usually separate the two modalities. The speech is usually played over a speaker, whereas the plurality of text messages are displayed on the screen. Users have no means to reference old speech messages or distinguish when they occurred in the thread relative to other messages in that thread.

Published U.S. Patent Application No. 2002/0023128 A1 ("the '128 Publication") describes a system where the screen area is split into six distinct windows. One window presents a chat history of one thread (the thread in focus) while another window displays a chat history of the combined plurality of the remaining threads. A chat history comprises a plurality of entries displayed on the screen that describe both inbound (i.e., received by the user's mobile terminal) and outbound (i.e., sent by the user's mobile terminal) chat messages. The entries are usually displayed on the screen in chronological order and usually only describe text messages.

Although the above-described chat systems fulfill the needs of some chat group users, they do not readily provide for integration with pre-existing mobile messaging systems. With known chat systems, during a chat session, subscribers can not conveniently contact or communicated with legacy mobile users operating outside of the chat message system. Therefore, there is a need to provide a chat system that permits chat threads between mobile users running chat applications and mobile users on legacy, out-of-band messaging systems.

SUMMARY OF THE INVENTION

It is an advantage of the present invention to provide novel methods and systems for managing both single-modal (i.e., either voice or text) and multi-modal (i.e., voice and text) wireless chat systems.

According to one embodiment of the invention, a wireless system permits chat-based communications between legacy mobile terminals and non-legacy mobile terminals. The non-legacy terminals execute a chat client application that provides chat services over wireless carrier networks. The legacy terminals generally lack the chat client, and are instead capable of data communication over an alternative data messaging service, such as a Short Messaging Service (SMS) conventionally provide by wireless operators. Communication between the legacy and non-legacy terminals is achieved as follows. First, an outbound chat message from the non-legacy mobile terminal is received at a server complex. The outbound message includes an address corresponding to the legacy mobile terminal. Components within the server complex detect the legacy address, and in response, build an inbound message that includes the originator address and is to be sent to the legacy terminal. The inbound message is sent to an aggregator, which then injects the inbound message into an out-of-band messaging system for delivery to the legacy mobile terminal. A reply message generated by the legacy terminal can be sent either directly to the non-legacy terminal over the SMS system or through the server complex over the SMS system, based on the originator address.

The techniques disclosed herein deliver such services over wireless packet networks bridging users across wireless operators using standard data transfer technologies in a manner that is not dependent on the wireless operator, or the underlying network technology used. This overcomes many of the challenges involved in providing universal wireless chat services, such as frequent change of IP address, dropped connections, blocking of network-initiated messages, and wireless resource contentions. The techniques also describe methods to integrate with legacy phones, initiate VoIP telephony calls, invoke commands, detect and transcode voice across various codecs, manage speech delivery within a context of a plurality of conversation threads, and how to communicate delivery receipts. Additionally, the systems and methods of the present invention accommodate the use of speech-based methods in chat environments. Additionally, they describe methods and systems for integrating machine-based services using multi-modal chatting interfaces.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 6 is a schematic illustration of a buddy list update message usable in the system of FIG. 2.

FIG. 7 is a table that illustrates the data contained in the presence manager shown in FIG. 2.

DETAILED DESCRIPTION OF THE PREFERRED EMBODIMENT

Figure 1:
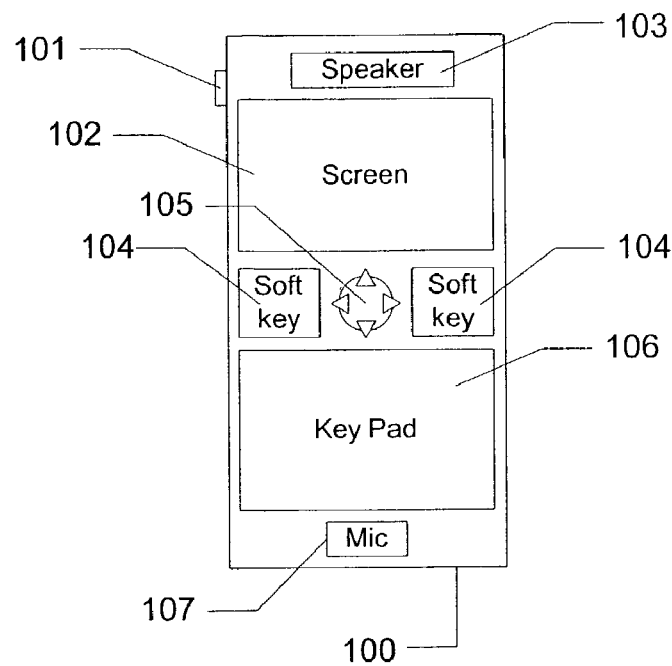
FIG. 1 is a schematic illustration of a wireless mobile terminal usable in a chat system.

The present invention may be more fully described with reference to FIGS. 1–15. FIG. 1 illustrates a wireless mobile terminal 100 that may comprise any wireless communication device such as a handheld cellular phone or a wirelessly enabled Personal Digital Assistant (PDA). The configuration of the mobile terminal 100 shown in FIG. 1 is exemplary only, and it is generally understood that a variety of terminals and terminal configurations could be used. As shown, the mobile terminal 100 comprises a speaker 103 for rendering signals, such as received speech, audible; a display 102 to render text and graphical elements visible; a navigation rocker 105 that allows a user to navigate a list or menu displayed on the screen; programmable buttons (or "softkeys") 104; a keypad 106 that allows the user to input digits, letters, and other symbols (e.g., punctuation); a microphone 107 that captures audio such as the user's speech; and a push-to-talk button 101 that allows the user to initiate recording and transmission of audio. These and other components of the mobile terminal (not shown) are well known in the art and need not be described in greater detail herein. Additionally, there are a variety of styles and instances of components that can be used instead of (or in conjunction with) the components described in FIG. 1. For example, the push-to-talk button 101 may be omitted and replaced with automatic voice detection mechanisms. Touch screens and hand writing recognition techniques can replace the need for the softkeys 104, the navigation rocker 105, and the keypad 106. The present invention is not limited in this regard. Additional components of the terminal that are not necessarily visible to the user but are necessary to implement chat functionality are further described with reference to FIG. 3. The input devices available on the wireless mobile terminal (e.g., keypad, softkeys, etc.) may be employed by a user of the wireless mobile terminal to initiate a session of chat software and, within the operation of the chat software, to initiate one or more chat conversations (threads) as described in greater detail below.

Figure 2:
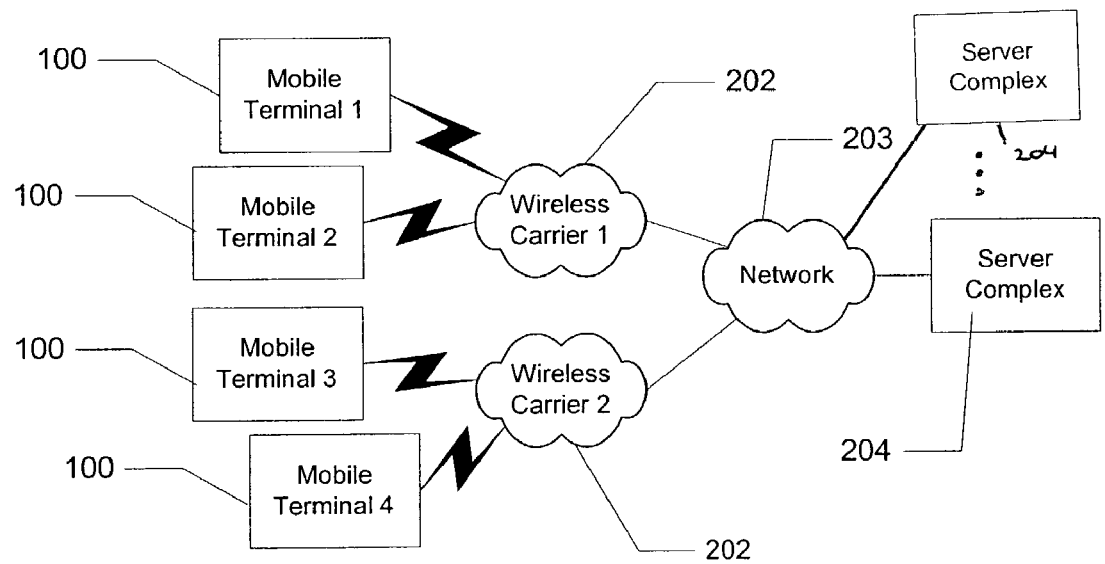
FIG. 2 is a block diagram of a wireless communications system in accordance with an embodiment of the present invention.

FIG. 2 illustrates the overall system architecture of a wireless communication system comprising a plurality of mobile terminals 100 in accordance with an embodiment of the present invention. The terminals 100 communicate with at least one chat server complex 204 by wirelessly transmitting data to a corresponding wireless carrier's infrastructure 202. As known in the art, the wireless carrier infrastructures 202 comprise those elements necessary to support wireless communications with the terminals 100. Various service providers (such as Verizon or Sprint in the U.S., or Orange in Europe) build and maintain such infrastructures. The data packets are sent on to a communication network 203 that forwards them onto the server complex 204. The communication network 203, which is a packet-based network, may comprise a public network such as the Internet or World Wide Web, a private network such as a corporate intranet, or some combination of public and private network elements. The server complex 204 preferably comprises a plurality of networked server computers that may be programmed to implement the functionality described below. The particular number of servers used and the manner in which they communicate with each other is a matter of design choice. Techniques for programming server computers and mobile terminals are well known in the art.

When the server complex 204 communicates with one or more mobile terminals, the server complex 204 sends its data to the network 203 that, in turn, forwards the data onto at least one of the carrier infrastructures 202. Each relevant carrier infrastructure 202 then transmits the data to one or more of its corresponding mobile terminals 100. Preferably, when a plurality of users chat together (i.e., send chat messages from one terminal 100 to another), data comprising text, speech, and/or graphical messages (or some combination thereof) are sent to the server complex 204. The server complex 204 then sends copies of the message out to the targeted terminals 100, preferably including, in one embodiment, the initiating or sending terminal.

The server complex 204 can be placed inside a wireless carrier's infrastructure 202, or that it may be eliminated in cases where direct terminal-to-terminal transfer is supported. In the latter case, substantially all of the chat messaging functionality is supported by the mobile terminals. Furthermore, the present invention would benefit systems other than packet data based systems, as well as systems that are limited in scope to a single wireless carrier's domain.

In the preferred embodiment, at least one chat server complex 204 resides outside the carrier's domain. As such, it is able to services a plurality of mobile terminals 100 that can be associated with a plurality of wireless carriers. In effect, the systems disclosed herein are independent of the wireless operators. They do not require any special hardware or software to be placed within the operator wireless network 202. The wireless operator's network (in conjunction with a public network 203) acts as a communication pipe between the mobile terminal 100 and the server complex 204. Preferably, standard packet data transfer protocols are used to transmit and route data messages back and forth between the mobile terminal 100 and the server complex 204, such as the Internet Protocol (IP), Transmission Control Protocol (TCP), User Datagram Protocol (UDP), and World Wide Web protocols, such as the Hypertext Transfer Protocol (HTTP). The server complex 204 acts as a gateway between the various transfer protocols. Each of the plurality of mobile terminals 100 establishes a connection with the chat server complex 204 using a suitable transfer protocol. Messages flow from the mobile terminal 100 into the server complex 204 over at least one protocol. The server complex 204 copies the message's content and broadcasts it to other intended recipient mobile terminals 100 using the appropriate transfer protocol suitable for each of the targeted mobile terminals 100.

Figure 3:
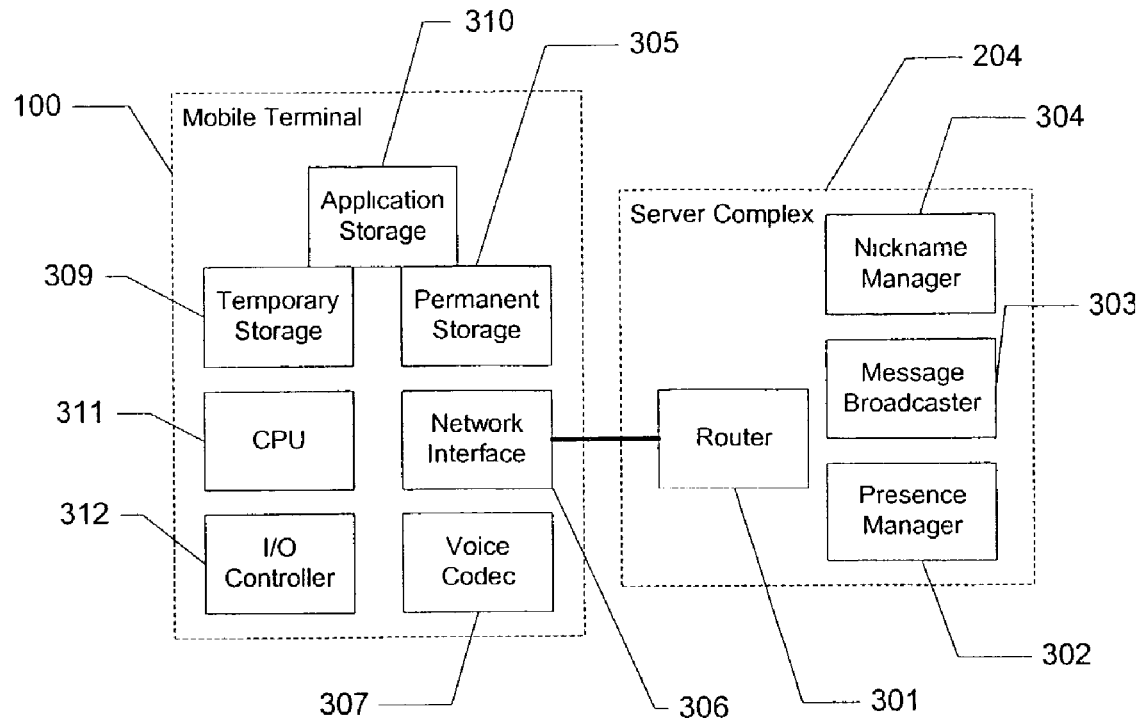
FIG. 3 is a block diagram of wireless communication chat components included in the system of FIG. 2.

FIG. 3 illustrates in more detail components found in both the terminals 100 and the server complex 204 used to exchange group speech and text chat messages. Focusing on the components of the terminal 100, machine-readable and executable instructions (typically referred to as software, code, or program) are preferably stored in an application storage (or memory) 310 and executed (or run) on a central processing unit (CPU) 211. All storage devices described herein may comprise any combination of volatile (e.g., random access memory) or non-volatile (e.g., read-only memory) storage as known in the art. Likewise, the CPU 211 may comprise a microprocessor, microcontroller, digital signal processor, co-processor, similar devices or combinations thereof. Using known programming techniques, the software can manipulate the display 102, capture speech from the microphone 107, capture input data from the keypad 106, navigation rocker 105, soft keys 104 and/or push-to-talk button 101 using the I/O controller 312. Outbound chat messages sent to the server complex 204, as well as those inbound chat messages received from the server complex 204, pass through the network interface 306 that provides connectivity between the terminal and the data network. Where the terminal 100 comprises a wireless device, the network interface 306 comprises the entire physical interface necessary to communicate with the server complex 204, including a wireless transceiver. Preferably, but not necessarily, speech sent to the server complex 204 is first encoded using a voice codec 307, which may be implemented in software, but is preferably implemented using a combination of hardware and software components. Similarly, voice from the server complex 204, may, when necessary, be decoded using the voice codec 307 before it is sent to the speaker 103. The software uses temporary storage 309 to save working data that does not persist between software initiations (sessions). On the other hand, the software uses the permanent storage 305 to persist data for longer periods of time that can span multiple software sessions.

Focusing on components of the server complex 204, the data traffic comprising encoded speech and text messages (e.g., outbound chat messages 400; see FIG. 4) flows into the server complex 204 preferably via the router 301. Note that the router 301, presence manager 302, message broadcaster 303 and nickname manager 304 may be implemented on one or more server computers or the like residing within the server complex 204. The router 301 directs the outbound chat message 400 towards a message broadcaster 303 that determines the plurality of inbound chat message copies (e.g., inbound chat messages 500; see FIG. 5) needed and their destinations. In the context of the present disclosure, the term inbound refers to messages directed to one or more mobile terminals, whereas the term outbound refers to messages sent by mobile terminals. The message broadcaster 303 decomposes the incoming message 400, and locates the list of recipient identifiers 402. It then queries a presence manager 302 to establish the recipients' current status 702 (i.e., an indicator of whether the recipient is ready to receive the particular type of message, speech and/or text messages only, etc.) and the terminal's address 703. FIG. 7 illustrates a table with the plurality of presence data records 700 contained within the presence manager 303. Each presence record 700, comprises the user's identifier 701, the current status 702, the current terminal address 703 (if known), a public display identifier, such as a public nickname 704 and a public short name 705, and a plurality of other user identifiers 706 that subscribe to the presence information of the user corresponding to that record. The public display identifiers or public nickname set 704–705 is used in inbound chat messages 500 sent to the terminal 100 unless the receiver (i.e., the receiving user) overrides the public nickname set 704–705 with private display identifiers or a private nickname set 802–803. When presence status 702 changes, the presence manager 302 sends a buddy list update message 600 to all the subscribers listed in the subscriber identifier field 706 of the corresponding presence record 700. The presence records 700 may contain other information and attributes such as forwarding address, processing rules that describe what to do in various circumstances, graphical representation for various status, profiles (i.e., a plurality of a different value sets that could be used at various times or depending on the receiver, etc.) and the like.

Although not illustrated in FIG. 3, the server complex 204 may include other components such as authentication and encryption servers that ensure the authenticity of the chat communication messages and secure the privacy of their content. The server complex 204 may also include a plurality of other components like speech-to-text and text-to-speech translators, natural language translators, voice transcoders, and other similar transformation gateways that transform the message, its contents, and any attachments (e.g., ring-tones, images, and so on) to a more meaningful and usable format by the receiver. Techniques for implementing such other components are well known in the art.

In the preferred embodiment, each of the plurality of wireless operators may deploy different wireless data technology in the wireless carrier network 202, such as Global System for Mobile Communication's (GSM) General Packet Radio Service (GPRS) and Code-Division Multiple Access's (CDMA) Single Carrier Radio Transmission Technology (1xRTT). In this respect, the systems disclosed herein do not depend on the data wireless technology employed.

In the preferred embodiment, the voice codec 307 used on the plurality of mobile terminals 100 is native to the terminals. The voice codec 307 native to the mobile terminal 100 is optimized for both the terminal's processing strategy and the wireless technologies used. In order for the system to be independent of the underlying wireless technology, the system uses commercially-available media scheme gateways (not shown). The media gateways transcode speech samples from one encoding to another. In operation, the message broadcaster 303 establishes the type of encoding used on the incoming message. It determines the type of encoding required for the each of the plurality of target mobile terminals 100. For each copy of the message, the message broadcaster 303 uses at least one media gateway to transcode the speech to a coding scheme appropriate of the target recipient. Techniques for detecting the type of encoding used by the incoming message and or required by the target terminals, as well as interfacing to media gateways are known in the art. Exception processing in cases where the media gateway is unable to fulfill a conversion can also be performed by the system. For example, a message may be sent back to the sender informing the sender that the message was not delivered to the target recipient because the system does not support the required transcoding techniques.

In addition, the system can be configured to optimize transcoding. For example, the message broadcaster 303 can reuse the same transcoding for all messages targeting mobile terminals 100 that require the same encoding. In addition, the message broadcaster 303 can avoid transcoding the speech if it detects that the message cannot be otherwise delivered to a target. Other optimization techniques can be employed as well.

In the preferred embodiment, the plurality of mobile terminals 100 are grouped and allocated among a plurality of chat server complexes 204. As such, each server complex 204 services a set of homogeneous mobile terminals 100 requiring the same speech encoding. Multiple server complexes 204 may use the same encoding. When a message reaches the message broadcaster 303 of one of the chat server complexes 204, the broadcaster forwards at least a copy of the message to another server complex 204 managing the connection with a subset of the intended recipients of the message. The message forwarded is transcoded by a media gateway in route between the two server complexes 204. The system benefits from using a common encoding for transferring the speech sample between the various server complexes 204. In particular, the message that is received by a server complex 204, is transcoded into the common encoding before it is forwarded to the plurality of other target server complexes 204 (only one transcoding is required in this case). Upon arrival of the message into each of the plurality of target server complexes 204, the message is converted into the encoding that is suitable for the target mobile terminal 100. Only one encoding at the end server complex is needed since all the terminals serviced by the complex use the same encoding. Messages not forwarded outside the server complex 204 need no transcoding since all the mobile terminals serviced by the complex use the same encoding. In this arrangement, simpler media gateways may be deployed between the complexes 204 because the gateways only need to transcode content between the common encoding and the encoding used by the mobile terminals 100 serviced by the complex 204. Also, detection of the type of transcoding required is inherent in the routing of messages i.e., structure and distribution of mobile terminals and does not required actual resolution based on any encoding information itself. It is done based only on the target address of the mobile terminal, which is resolved in all cases to route and direct messages. For example, instead of using multiple server complexes 204, a single server complex 204 can be subdivided where a plurality of message broadcasters 303 are used in the same spirit as distributed server complexes 204. The invention is not limited to any particular arrangement of server complexes. Alternative arrangements can be employed for the server complexes.

Preferably, a nickname manager 304 resides in the server complex 204 and is responsible for managing lists of nickname sets 802–803 used by the receiver of an inbound chat message 500 to override public nicknames and short names. Note that nicknames and short names differ primarily in their length. Nicknames may be of any arbitrary length (possibly limited as a matter of design choice), whereas short names are preferably fixed in length or size. Additionally, nicknames and short names are instances of display identifiers used to identify the originators of chat messages. Such display identifiers are distinguished from identifiers used internally by the system to identify particular users (e.g., identifiers having reference numerals 701, 403, and 604 in the accompanying FIG.s). It should also be noted that short names might differ from nicknames in format or type. The system may use graphical, symbolic or other suitable forms of short names that are compact and fixed in dimension while using textual forms for nicknames. The system may vary the graphics and symbols based on context, user preferences, presentation themes and personalities.

Figures 8, 9:
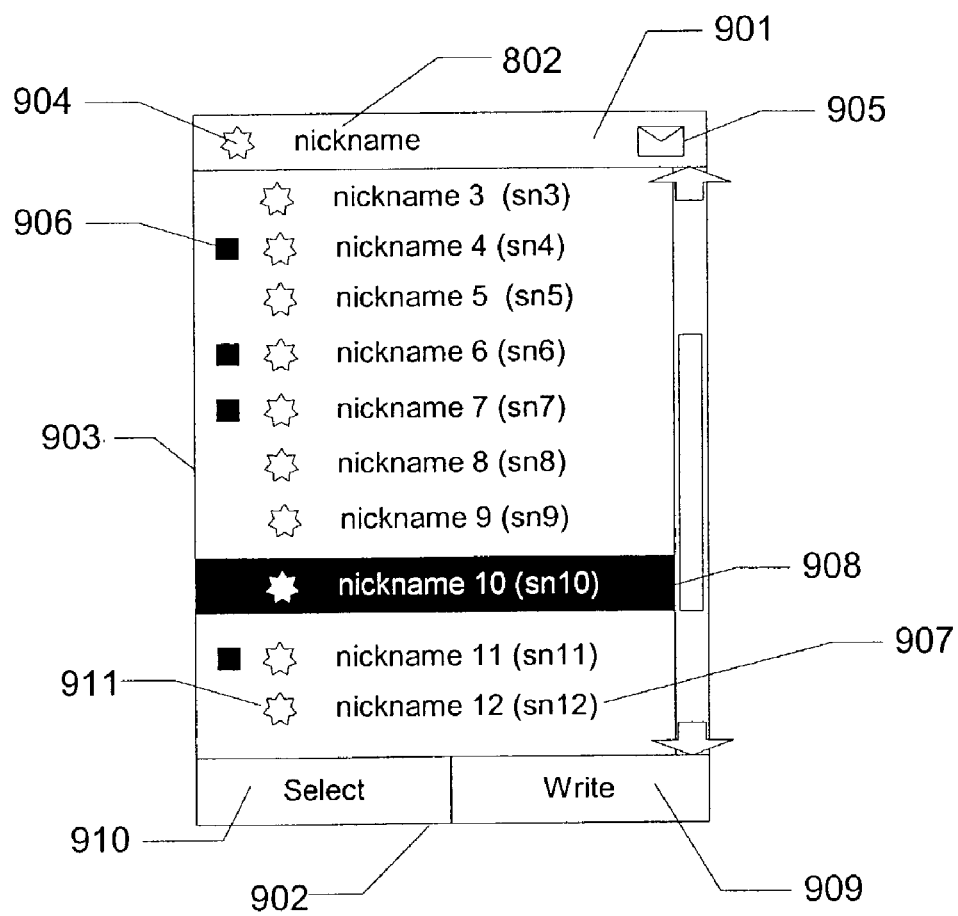
FIG. 8 is a table that illustrates the data contained in the nickname manager shown in FIG. 2.
FIG. 9 shows a buddy list display, presenting an exemplary nickname list in alphabetical order.

FIG. 8 illustrates the nickname record 800 contained within the nickname manager 304. Preferably, each nickname record 800 comprises a receiving user's identifier 701, the buddy's identifier 801 (i.e., the identifier of the chat buddy for whom the receiving user desires the message broadcaster 303 to replace the buddy's public nickname set 704–705 with the receiver's private nickname set 802–803 on all inbound chat messages 500) and the private nickname 802 and private short name 803. Like the case of presence records 700, the nickname records 800 may contain other information and attributes such as forwarding address, processing rules, graphical representation for various status, profiles (i.e., different field values that could be used in various times, etc.) and so on. Upon receiving a message targeted to a recipient designated by the receiving user's identifier 701, the nickname manager 304 determines the buddy identifier 801 (i.e., the identification of the chat participant that initiated transmission of the message). Based on the buddy identifier 801, the nickname manager 304 inspects the nickname records corresponding to the targeted recipient. If the buddy identifier is not found in the targeted recipient's nickname records, the message is sent to the targeted recipient as in inbound message with the public nickname and public short name of the sender. In this case, the public nickname and/or short name of the sender will thereafter be displayed on the targeted recipient's mobile terminal display. If the buddy identifier is located in the targeted recipient's nickname records, the nickname manager determines the private nickname and private short name associated with the buddy's identifier and replaces the public nickname with the private nickname and the public short name with the private short name in the subsequent inbound message sent to the targeted recipient, thereby causing the private nickname and/or private short name to be displayed on the recipient's mobile terminal display. In this manner, users (i.e., recipients) have a greater degree of control over how chat histories are displayed on their terminals. Note that the process of determining private display identifiers and substituting them for public display identifiers could be performed by the mobile terminals assuming that the necessary nickname records are stored on the mobile terminals.

Figure 4:
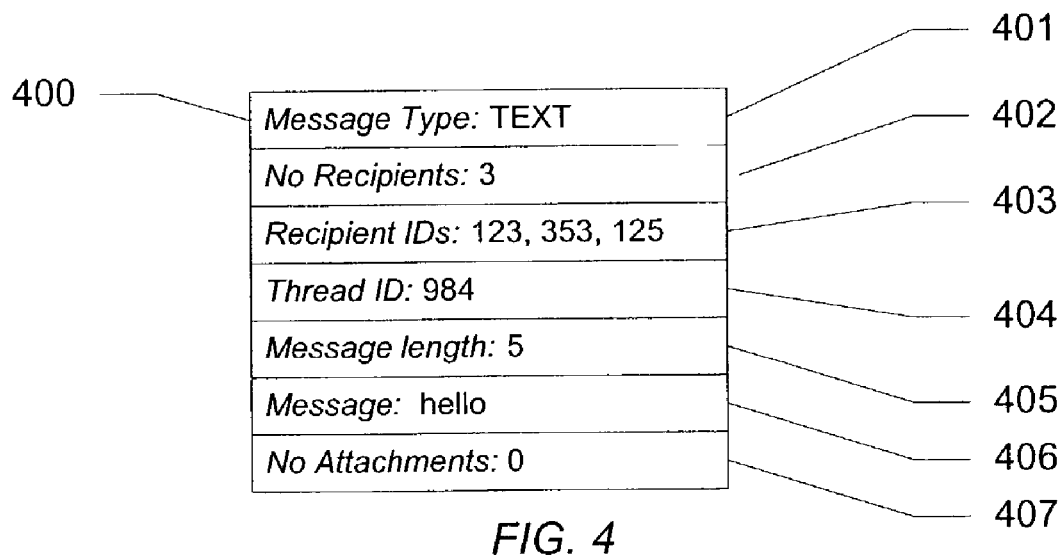
FIG. 4 is a schematic illustration of an outbound text message usable in the system of FIG. 2.

FIG. 4 illustrates an outbound chat message 400 that the terminal 100 sends to the message broadcaster 303. The outbound chat message 400 comprises a message type 401 (e.g., text, speech, and so on), a number of intended recipients 402, a plurality of recipient identifiers 403, a thread identifier 404, a message length 405, message content 406, and a number of attachments 407. Preferably, the mobile terminal 100 generates the thread identifier 404 by aggregating a client identifier and a session identifier with a thread sequence number. The thread sequence number is a terminal-side number that starts from 0 each time a session is initiated. The client increments the thread sequence number by 1 each time the terminal 100 generates a new thread. Although not illustrated in FIG. 4, the payload may contain message encoding types and other attachments (e.g., icons, ring-tones, and so on). Other elements can be added to the outbound chat message, such as sequence numbers, time stamps, or the like.

The message broadcaster 303, upon receiving the outbound chat message 400, first compiles a list of target recipients comprising the sender's identifier (i.e., the first recipient identifier in the recipient identifier list 403) and the plurality of other recipient identifiers (i.e., the recipient identifiers in the identifier list 403 other than the sender's identifier). For each target, the message broadcaster 303, determines the status 702 of the target by locating the target's identifier in a presence record 700 with the matching identifier 701. For each available target (i.e., where the presence record indicates that the recipient can receive the message type 401), the broadcast manager 303, composes an inbound chat message 500. The message broadcaster 304 queries the nickname manager 304 to find the receiver's local nickname set 802-803 for the other recipients (i.e., the identifiers comprising the original list of targets without the receiver's identifier.) If no information is found (i.e., the receiver did not build a nickname record 800 for the particular recipient), the message broadcaster 304 queries the presence manager 302 for the recipient's public nickname information 704–705. The message broadcaster 303 extracts the receiver's address 703 from the presence manager 302 and sends the inbound message 500 to the receiver's terminal 100 via the router 301. Those having ordinary skill in the art will doubtlessly recognize that means to optimize the creation and broadcasting of messages, such as using common compression and encoding techniques may be employed, and that other information may be included in the inbound chat message 500, such as sequence numbers, timestamps, and so on.

Figure 5:
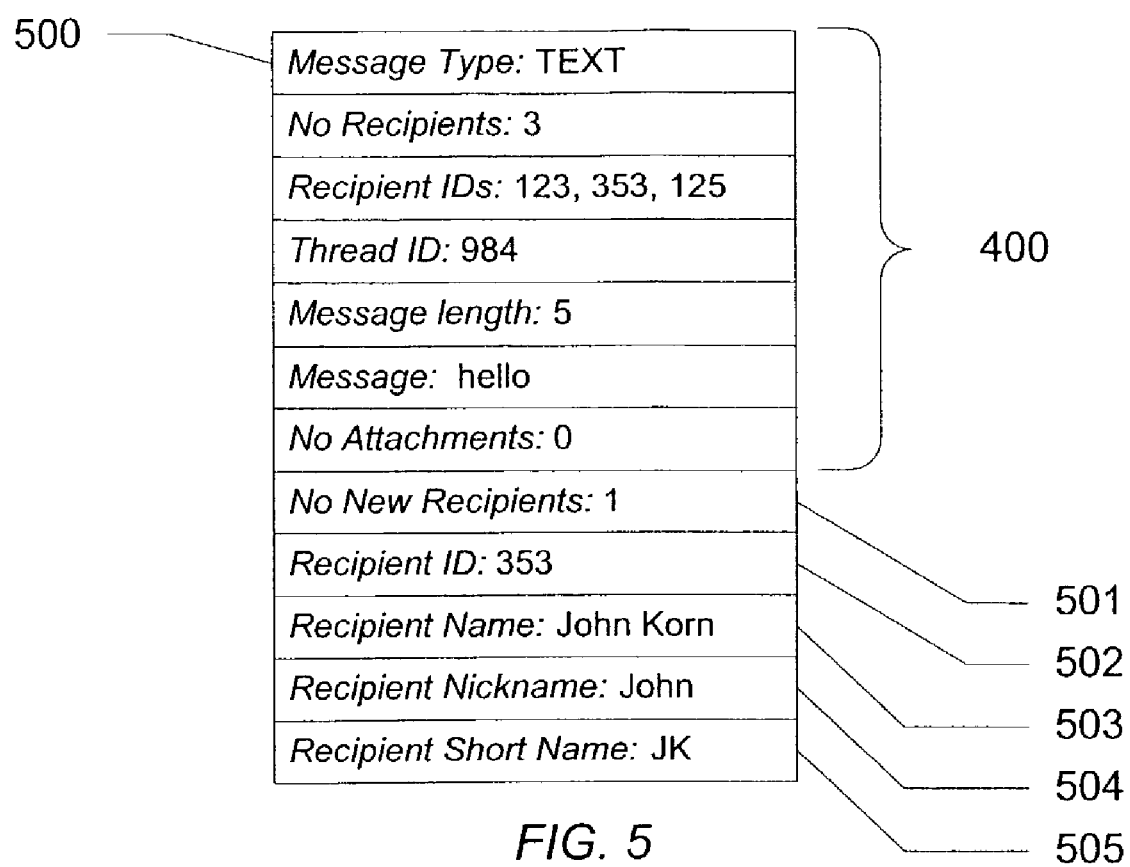
FIG. 5 is a schematic illustration of an inbound text message usable in the system of FIG. 2.

FIG. 5 illustrates an inbound message 500 sent by the server complex 204 to the terminal 100. As shown, the inbound message 500 is largely a copy of an outbound chat message 400 sent from a terminal 100 to the server complex 204. The inbound message 500 preferably comprises the original outbound message 400 and a definition of new users not known to at the terminal 100 (i.e., not already in the receiver's buddy-list.) The new user definition comprises the number of new definitions 501 and a plurality of individual definitions comprising the recipient's identification 502, full name 503, public nickname 504, and public short name 505. In some cases, the original outbound message has to be transformed to be understood by the receiving terminal 100. It should also be noted that the server complex 204 may only need to include the new user definition once during a session. That user definition is placed in the terminal's 100 temporary storage 309. This enables less wireless data transfer. Other attributes can be placed in the inbound chat message 500 including such things as time stamps, sequence numbers, and so on. It should be noted also, that anonymous identifications and virtual or group identification could be used as well.

When a participant's presence status 702 changes, the message broadcaster 303, sends a buddy list update message 600 to other users subscribed to the participant's presence status 702. FIG. 6 illustrates a buddy list update message 600 sent from the server complex 204 to the mobile terminal 100. The message 600 comprises a list type 601 (e.g., alphanumeric list, group list, etc.), the number of groups identified in the message 602, at least one group definition 603–604, a list of ungrouped individuals 605–606, and a plurality of user definitions 502–505, 607. Note that the recipient status field 607 indicates the value of the presence status 702. A group definition, in this context, comprises a group name 603 and a plurality of recipient identifiers 604. A recipient's identifier can exist in a plurality of group definitions. However, preferably, there will be only one user definition 502–505, 607. Furthermore, preferably, for each identifier in the list of recipient's identifiers 604, there is at least one user definition 502–505, 607 for that recipient in the buddy list update message 600. The list of ungrouped individuals is a special unnamed group. It comprises the number of ungrouped individuals 605 and the list of recipient identifiers 606. Preferably, recipient identifiers in the ungrouped definition cannot be in other groups. The records 600 can contain other fields of attributes and information such as presentation icons, audicons, or the like. In addition, it should be noted that the message does not have to contain the entire list of groups and individuals on updates, rather incremental updates could be used instead.

The presence manager 302 may send buddy list update messages 600 to the terminal 100 upon receiving a refresh request from the terminal 100. Those having ordinary skill in the art will recognize other reasons to send buddy list updates (e.g., initial connection,) as well as optimizations in the form of encoding the contents, sending incremental updates instead of the entire list, and so on.

In another embodiment, parts (or all) of the functionality of the message broadcaster 303 and the nickname manger 304 can reside on the terminal 100. In that case, the terminal 100 communicates with the server complex 204 when it exchanges presence information. Chat communication messages are broadcast from one terminal 100 to the plurality of other terminals 100 in a point-to-point fashion.

FIG. 9 illustrates a buddy list display with its entries sorted alphabetically. In a preferred embodiment, the screen 102 is divided into three regions. In a topmost region, there is a title bar region 901 allowing the display of one line of text and graphic symbols (i.e., icons). The software uses this region 901 to provide the user notices and other meta-information about the current task. In the case of the buddy list display, the title bar 901 comprises the user's own presence indicator 904, the user's own public nickname 704, and, on occasion, an inbound chat message indicator 905. Preferably, the presence indicator 904 is a icon that varies in appearance depending and the presence status 702 (i.e., there is a different and distinguishable feature associated with the various status values). Preferably, the inbound chat message indictor 905 is an icon accompanied by an audible sound when the icon is first displayed. Combined, the visual and audible notice indicate to the user that there is at least one unheard and/or unread inbound chat message 500 that has arrived at the terminal 100. If the user's nickname is too long for the title bar 901, the software scrolls the title bar leaving only the inbound chat message indicator 905 in a fixed position for quick access. There are many familiar examples in the art today of such display techniques, any of which may be incorporated for use with the present invention.

In the middle region of the display is a content region 903. In the case of the buddy list display, the software preferably places a multi-selection list in the content region 903, which list has a plurality of entries each representing a buddy that was received by the terminal 100 from the server complex 204 in a buddy list update message 600 and stored in the temporary storage 309. Each entry can be highlighted 908 by the user. Highlighting and navigating list entries are implemented using common techniques in the art. Each entry in the list comprises a selection indictor 906 that indicates whether the user has selected the particular buddy for chatting (i.e., sending a chat communication message), the buddy's presence indicator 911, the buddy's nickname 802 or 704, and/or the buddy's short name indicator 907. Note that symbols other than text could serve the same function as the short name indicator 907 for the short name information 705 or 803 as indicated previously. For example, icons or other graphical elements could be used so long as they sufficiently differentiate buddies from one another. Further still, a combination of such graphical elements and text could be used if sufficient screen space is available.

On the bottom of the screen 102 is a softkey label region 202. Preferably, there is a minimum of two labels 909–910. The number of labels depends on the actual number of softkeys 104 available on the terminal 100. In the illustrated embodiment, the left softkey label 910 is "select" while the right softkey label 909 is "write" if there is at least one selected entry in the buddy list. Otherwise, the right softkey label 909 is labeled "chat". If the user activates the left softkey with a single click (referred to onward as "single-clicking"), the highlighted entry 908 is selected (or deselected if it was already selected,) and consequently its selection indicator 906 changes to reflect the new state. If the user presses and holds (referred to onward as "click-holding") the left softkey, the software presents the user with a plurality of options such as the option to deselect or select the entire list; switch to other displays (e.g., chat history display described in FIG. 11, group ordered buddy list display described in FIG. 10, etc.); request the details of the buddy (e.g., full name, the public nickname set 704 705, etc.); change the nickname set 802–803; show or hide fields (e.g., the short name indicator 907), and so on. Once again, techniques for programming such functionality and associating it with single-clicking and/or click-holding are well known in the art. It should also be noted that the use of a text string to represent a softkey label is exemplary and only intended to capture the spirit or intent of the invention. Other forms of labels can be used, such as graphical symbols, and the like.

If no buddies are selected, the right softkey label is "chat". Single-clicking or click-holding the right softkey in this context switches the user to chat history display described in more detail with reference to FIG. 11. If the user pushes the push-to-talk button 101 (referred to onward as pushes-to-talk,) an audible indicator reminds the user that buddies have to be selected first. If there is at least one buddy selected, single-clicking or click-holding the right softkey begins to compose a message for a new thread to the selected buddies. The display in that case switches to the text message editing display described in more detail with reference to FIG. 14. If the user pushes-to-talk, the display switches to the chat history, and the user is able to record and transmit a speech message and consequently start a new thread with the selected buddies.

Figure 10:
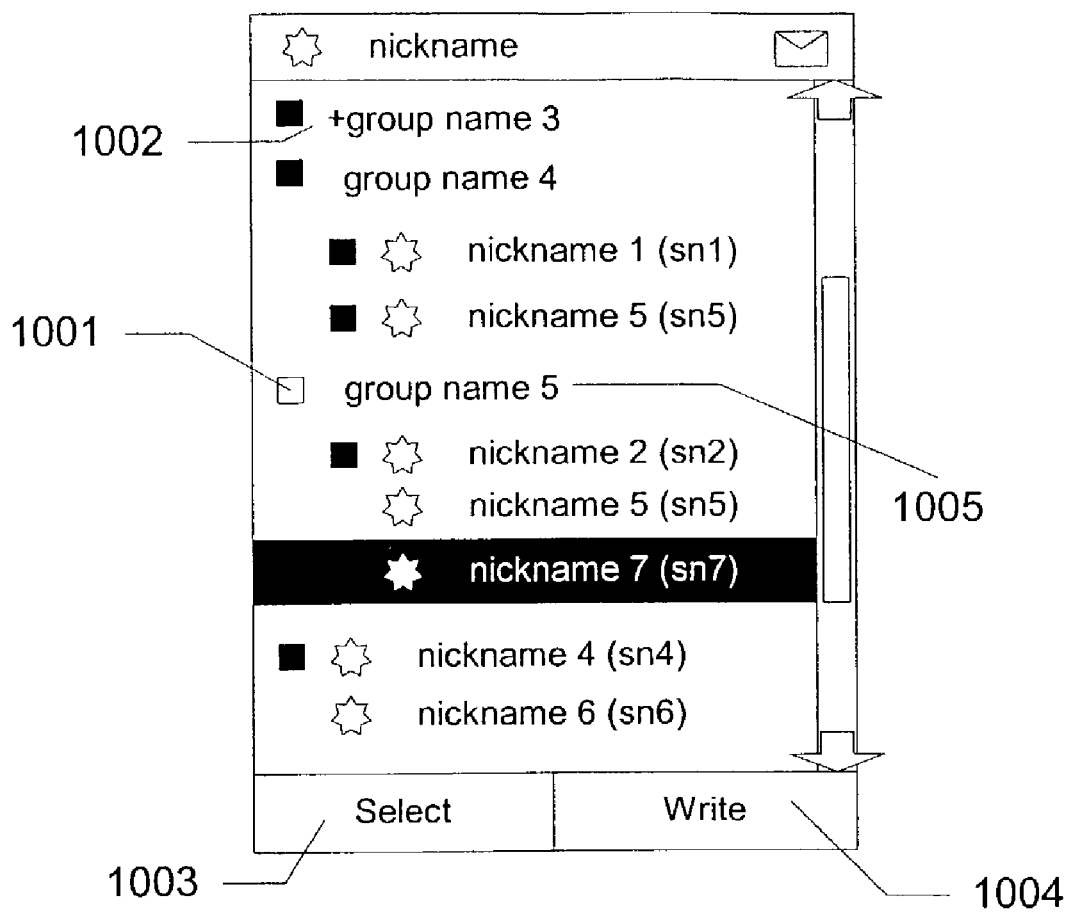
FIG. 10 shows a buddy list display, presenting an exemplary nickname list in group order.

FIG. 10 illustrates a buddy list display with its entries sorted by group. In a preferred embodiment, group entries and their member buddies are listed first followed by a list of ungrouped buddies. Individual entries are identical to those displayed in an alphabetically ordered list with the exception to a preferred indentation (i.e., an annotation that indicates membership to a group). Group entries comprise a group name 1005 and a group selection indicator 1001 which is similar to the individual selection indicator 906 except that a group selection indicator can indicate more that just selected and unselected states; it can indicate partial selection as well. Referring to the examples illustrated in FIG. 10, solid squares (group selection indicators) such as in groups 3 and 4, are completely selected. Group 5 has an empty square indicating partial selection. If there is a group without any of its members selected, there is no indicator at all on the group level (or the individual buddy level). To select a group, a user can either select all the members one by one or select the group directly. To partially select a group, a user can start by selecting a group then deselecting one or more member. Alternatively, a user can start with an unselected group and select one or more members. A group entry can be collapsed (i.e., the members of the group are suppressed from the display.) In that case, the entry is annotated with a collapse indicator 1002. If the user highlights a collapsed group for a length of time, the group automatically expands to show the members. When the user moves to another group, the group display style reverts back to its collapsed state again. If a user selects or deselects a group entry, all the members of the group are automatically selected or deselected. The softkey labels 1003–1004 are similar in behavior to those described with reference to FIG. 9. However, click-holding when a group entry is highlighted (or an individual within a group is highlighted) presents the user with additional options to mange the group, such as renaming the group; removing the group or its the member; adding a new group or individual, collapsing or expanding the group; collapsing or expanding all groups; and so on. It should be noted that, in a preferred embodiment, only one level of grouping is allowed (i.e., nested groups are not allowed), although multiple levels could be provided.

Preferably, where the system supports presence profiles that are coupled to recipient users or groups, then as the user highlights the plurality of buddy entries 908, the user's presence indicator 904 and nickname 704 in the title bar 901 will vary to indicate the presence information of that particular buddy (or group of buddies). Also, it should be noted that if the information in the highlighted entry 908 is too long, the software can scroll the information, expand it, or use other techniques common to the art to present all the information to the user.

It is understood that there are other means to order lists (by date, events, and so on), and that other annotations could be added to the entries. For example, an indicator that there are messages that have not been read/heard available from the individual or group may be used.

Figure 11:
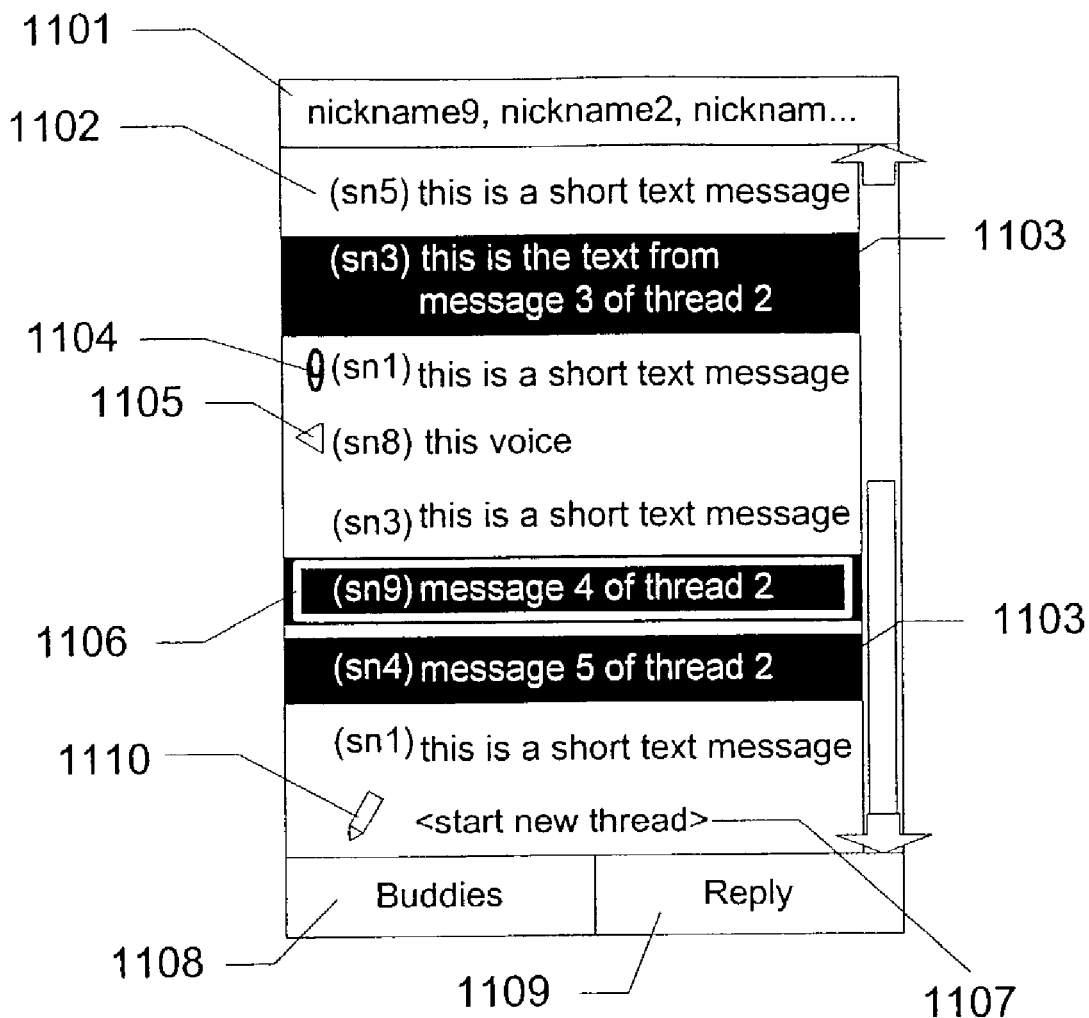
FIG. 11 is a schematic illustration of a chat history display.

FIG. 11 illustrates a chat history display. The content region 903 of the display is a single selection list comprising a plurality of entries representing inbound chat messages 500 received by the terminal 100 and a plurality of entries representing outbound chat messages 400 transmitted by the terminal 100. Outbound chat messages are preferably echoed back to the sender in full or in part (e.g., speech messages might not include the actual speech sent) in the form of inbound messages. That is, outbound chat messages go to the server complex for transmission to the targeted recipient(s). In addition to sending the message to the targeted recipient(s), the message broadcaster sends a copy of the outbound message to the transmitting terminal (i.e., the sender) as an inbound message. In some cases, the copy of the message (the inbound message) to the transmitting terminal might not be identical to the message that was sent (the outbound message). For example, in a presently preferred embodiment, the speech content of an outbound voice message is not copied back to the transmitting terminal; only a text portion of a voice message is sent back as in inbound message. Note that, in a presently preferred embodiment, voice messages have text appended to them, even if only a generic character string or symbol is used to indicate that the message was a voice message. Of course, if speech-to-text conversion is available, the actual speech content of the message could be converted to text and copied back to the transmitting terminal. In this manner, the occurrence of voice message results in an entry being displayed on the screen. In an alternative embodiment, rather than having the text of an outbound message sent back to the transmitting terminal via an inbound message, the transmitting terminal can locally echo the text to the display directly. In this manner, use of wireless resources may be minimized.

A common problem in the art of chatting is the representation of successful delivery. A preferred approach to giving notice of delivery is to send an outbound message 400 back (as an echo inbound message 500) to the sender's mobile unit communicate to the sender that the message has been reliably delivered to the message broadcaster 303 in the chat server complex 204. Alternatively, the representation of that notice can be a text message that is placed in the chat history with a message indicating that the message sent was received by all recipients. The echo can be sent back when the outbound message 400 is received by the message broadcaster 303. The chat server complex 204 can then send a receipt notice when all the recipients have received the message. Preferably, the original echo is annotated when the delivery receipt arrives (e.g., changes color and/or font, or is adorned with a symbol like a check mark, etc.) to give notice of receipt. In an alternate approach, the echo message back to the user can be delayed until the broadcaster 303 has received confirmation that all intended recipients received copies of the message. However, the approach may present some presentation side effects that can be confusing to the user in environments where the delivery latency is relatively long and there is a high degree of latency variability between the deliveries of the plurality of copy messages. In such situations, at least one recipient may respond back to the sender before the message reaches the remaining recipients. In that case, the sender would see on his/her chat history display (see e.g., FIG. 11) the response to the message before the echo. Several techniques can be deployed to rectify this problem. For example, the mobile terminal 100 or the server complex 204 could delay presentation or delivery of the recipient response until the original message was received by all recipients and the echo sent back to the user.

While not illustrated, at any time, the user may query the system as to who has (or has not) received the message. Other implementations may choose to forgo allowing the user to query the system for outstanding deliveries and instead provide comparable information by sending a plurality of receipt notices (one each time a copy is delivered to the user). While such techniques may be simpler to support in the chat server complex 204, they may require more communication resources.

In the example of FIG. 11, each entry comprises an attachment indicator 1104–1105 that indicates if there is any attached content (e.g., documents, files, etc.) or transmitted speech available; the short name of the sender 705 or 803, and at least part of the message content or text (all of the text if the text fits within 2–3 lines). Although not illustrated in FIG. 11, there may be other indicators present on an entry such as a locked entry indicator (i.e., indicates that an entry was saved in permanent storage 305 and will always appear in the chat history display until it is unlocked). Note that lesser amounts of information may be included in each entry of the display. For example, only the message content could be displayed without the short names of the senders.

When an entry is highlighted 1106, the plurality of nicknames 802 or 704 of the sender and the other recipients is placed in the title bar 1101. If the list is too long, the contents of the title bar 401 scroll. Alternatively, short names or other symbols may be used in place of the nicknames in the title bar 1101. As the user selects an entry 1106, all related chat messages in the same thread are emphasized 1103 as well. Emphasis can be done by changing or annotating the related entries or changing unrelated entries (e.g., graying out the entries). If a selected entry is too long to be displayed in its entirety and is selected for a length of time, the contents of the entry can expand automatically to display the entire text content. In that case, when the user moves to another entry, the entry immediately shrinks back to fit within its originally allocated space of 2–3 lines of text. The actual number of allocated lines depends on the screen size. As new inbound chat messages 400 arrive, new entries are added automatically to the list, for example, at the bottom of the list. The bottom or buddy list entry 1107 is a special entry referencing the list of buddies currently selected in the buddy list display. The user can use the entry to start a new thread with the buddies. The bottom entry 1107 only appears when the user has selected buddies, and comprises an icon 1110 distinguishing the entry from other "regular" chat message entries. If the user selects the bottom entry 1107, the list of buddies appears in the title bar 1101 in the same manner recipients are displayed when the "regular" entries of the chat history are highlighted.

The left softkey label 1108 is "buddies". Single-clicking or click-holding the left softkey switches the user to the buddy list display (see FIGS. 9 and 10). The right softkey label 1109 is "reply" if the highlighted entry is a chat message entry. Otherwise, it is labeled "write," as before. Single-clicking the right softkey moves the user to a message editor display described in more detail with reference to FIG. 14. The target recipients of a message are either derived from the list of recipients of a chat message entry 1106 or those associated with the buddy list entry 1107. In the case where the highlighted entry is a chat message entry 1106, click-holding the right softkey presents the user options similar to those described in more detail with reference to FIG. 13. Otherwise, if the highlighted entry is the buddy list entry 1107, a "send to all" action is indistinguishable from normal "reply to all action" of single-clicking. If the user pushes-to-talk, the target recipients are compiled (i.e., either the sender and recipients of the chat message entry 1106, or the buddies of the buddy list entry 1107), the title bar is updated in a manner described in more detail with reference to FIG. 12, and the recording and transfer of a speech chat message begins.

It should be noted, that if an inbound speech message arrives while the chat history display is not visible to the user, the received speech is queued up. In a current implementation, the most recently received speech message (or at least that portion that will fit in available memory) are queued at the receiving terminal. In an alternate embodiment, such queuing can occur at the server complex such that the recipient can request playback within a predetermined period of time. Further still, queuing could occur at both the terminal and the server-side such that playback may be requested from the server in the event that a given speech message is no longer available at the terminal. While the speech entry is the most recent speech entry, the associated speech remains queued and ready for automatic playback upon the user's return to the chat history display. When the user switches back to the chat history display, if the speech entry is visible on the screen, it is automatically played back. Only the last speech message received is automatically played back. The playback is abandoned if the user returned to the chat history to record and transmit a speech chat message.

Unambiguous delivery of speech messages to the user is a problem when integrating multiple multi-modal threads of conversation into a single chat history. In the current art, it is difficult for a user to associate speech with a particular discussion threads. The system disclosed herein solves the association problem in two ways. First, as discussed above, each speech message leaves an entry on the display. The entries link to their corresponding threads and represents at least the sender and the list of other recipients of the message. This, however, is not sufficient in cases where the user is unable to view the display while listening to speech messages. For this reason, the system disclosed herein uses a second technique in conjunction with the first. Preferably, when a user selects a thread, all speech messages associated with the selected thread are played back to the user automatically, unless otherwise provisioned by the user. Any speech messages not belonging to the selected thread are not played back automatically. Instead, the mobile terminal 100 presents an audible signal to the user indicating that there is other incoming speech message(s) in other thread(s). The user at that point can chose to playback the message or request the system drop it. Irrespective of whether the incoming speech message is played, the text portion of the incoming speech message is presented on the display. This helps the user in the decision process of choosing to listen to the message or ignoring it. Further optimizations are possible. For example, the user can be given the option to drop the message. Any speech data being transmitted is then dropped and the server is notified that it can stop transmitting the remainder of the speech message and begin transmitting the next message in the queue (if one exists).

The delivery techniques can be optimized. For example, the mobile terminal 100 may send a message to the chat server complex 204 whenever the user selects a thread. This allows the chat server complex 204 to suppress sending the speech components of the speech message not belonging to the selected thread until the user indicates he/she wants to listen to the speech. This minimizes sending large amounts of data to the mobile terminal 100 that may not be used.

Figure 12:
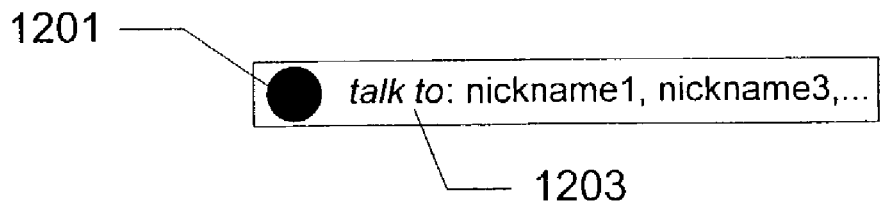
FIG. 12 is a schematic illustration of a title bar for the chat history display when speech is recorded.

FIG. 12 illustrates the title bar of a chat history display when the user is recording and transmitting an outbound speech message. The title bar comprises a recording indicator 1201; the plurality of recipient nicknames 705 or 802 (which does not include the sender) and, optionally, a single label 1203 indicating to the user that he or she is talking to the identified recipients. If the list of recipients is too long, the list scrolls; however, the recording indicator 1201 remains fixed in position. There may be a delay between the times when the user pushes-to-talk requesting to record and transmit speech and when the system grants the user access to do so. Preferably, the recording indicator 1201 is an icon that changes its appearance (e.g., color or graphic symbol) to indicate when the user has and or loses speech recording/transmitting access. Shortly after the user releases the push-to-talk button 101, the title bar reverts back to the normal title bar 1101 on the chat history display.

Figure 13:
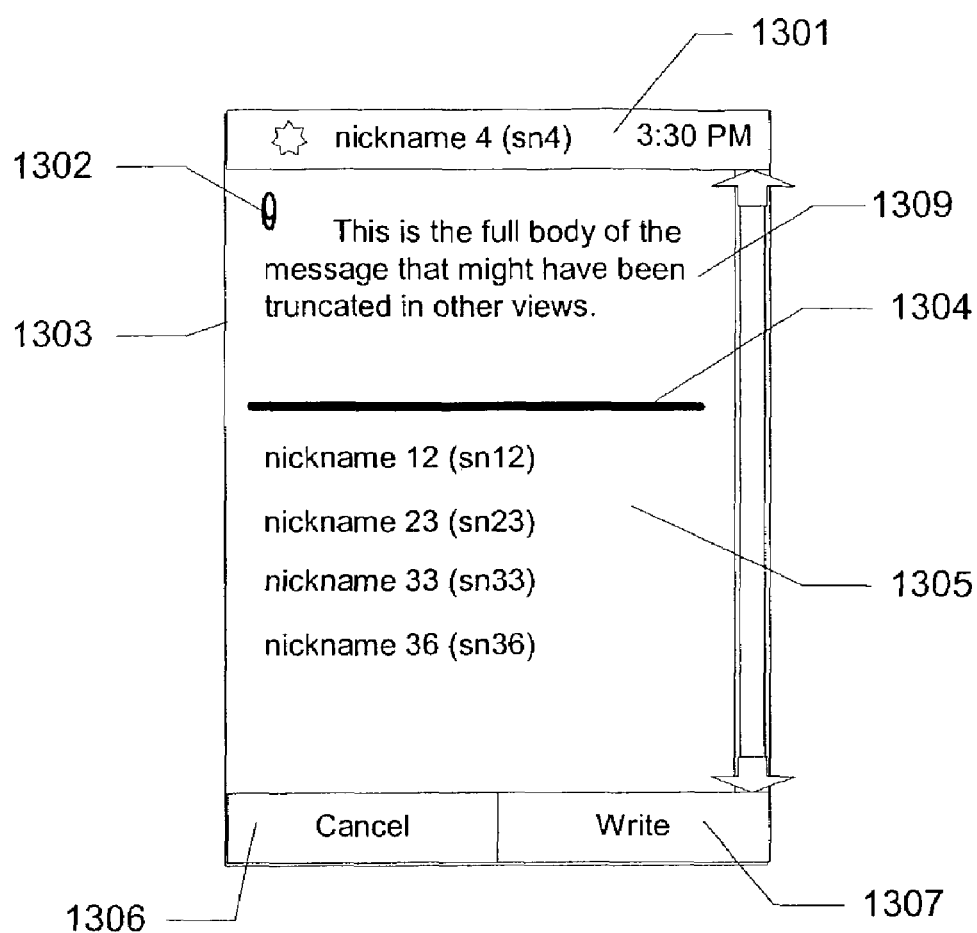
FIG. 13 is a schematic illustration of a detail view display of an exemplary single communication message.

FIG. 13 illustrates a detail view display of an inbound chat message 500. The title bar 1301 comprises the sender's presence indicator 904; the sender's nickname 705 or 802; and optionally a time stamp (when the message was sent or received.) If the information in the title bar is too long, the nickname scrolls. In that case, the remaining indicators preferably remain fixed. The content region 1303 comprises an attachment indicator 1302 that notifies the user of the availability of attachments or speech; the full text of the message 1309; a separator 1304; and the plurality of entries representing other recipients (not including the sender or the receiver). In the example shown in FIG. 13, each entry comprises the user's nickname set 703–705 or 802–803. Alternatively, each entry could comprise only some portion of the nickname set (either the nickname or short name) or some other type of display identifier. The left softkey label 606 is "cancel". Single-clicking and click-holding the left softkey exits the display and restores the previous display. The right softkey label 607 is "write". Single-clicking the right softkey moves the user to a message editor display described in more detail in FIG. 14. Click-holding the right softkey presents the user options such as playing back the available speech; viewing or storing available attachments; locking the entry in the chat history display; saving the inbound chat message in permanent storage 305; moving to the next or previous chat message, replaying to only the sender or one of the other recipients (i.e., initiating a new thread), and so on. If the user pushes-to-talk, the detail view display is exited. The user moves to the chat history and begins talking to the sender (unless the user is the sender) and all other recipients. Playback of any queued speech is abandoned in that case.

Figure 14:
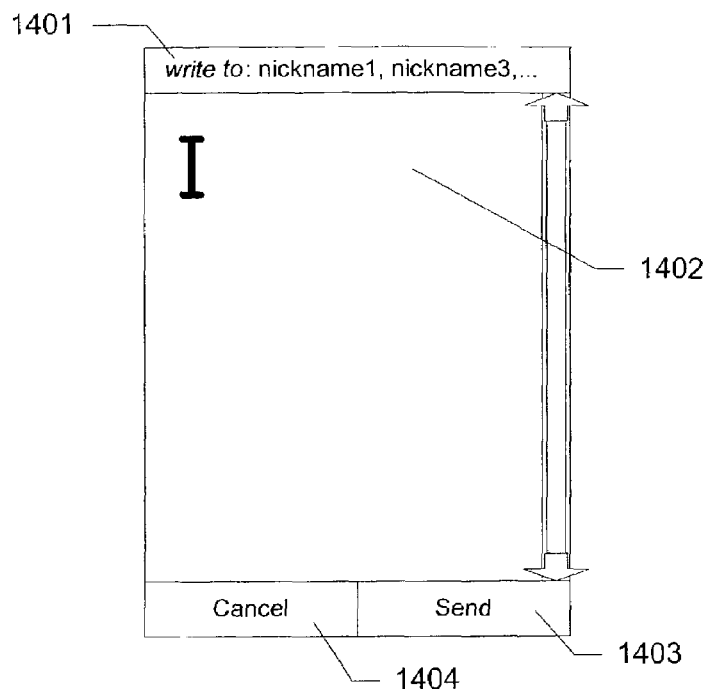
FIG. 14 is a schematic illustration of a text message editor.

FIG. 14 illustrates a text message editor display. In this embodiment, the title bar 1401 comprises a plurality of target recipient nicknames 704 or 802 and a single action label that indicates to the user that he or she is composing a message. The title bar 1401 scrolls if the contents are too long. A text entry area 1402 is provided below the title bar 1401 for composing text messages. The left softkey label 1404 is "cancel". Single-clicking and click-holding the left softkey exits the display, preferably abandons the contents, and restores the previous display (except in the case where the previous display was a detail view display, in which case the detail view display's previous display is restored instead of the detail view display.) The right softkey label 1403 is "send". Single-clicking the right softkey causes the software to build and send an outbound text message 400. Click-holding the right softkey provides the user a set of options such as attachment of other content (e.g., ring tones, etc.), spell checking the message, displaying the full details of the recipients and so on. Preferably, if the user pushes-to-talk, the display is exited, its contents are abandoned; the user moves to the chat history and begins talking to selected recipients. Playback of any queued speech is also abandoned in that case.

The present invention is not limited to multi-modal chatting between humans. Multi-modal chatting can include machines. There exists text-based chatting systems, such as those deployed by Active Buddy, Inc., that allow users to interact with inventive services in the network using a chat metaphor. Unlike these systems, however, the systems disclosed herein allow the chatting dialogue to use both text and speech. For example, a user wishing to get status on a delivery of a package may send a speech message to a package deliver service presence. The speech would include at least the package identifier. The automated response service, using speech recognition techniques known in the art, determines the user's request and composes a response. That response can be speech based (e.g., it may send a speech message indicating it wasn't able to understand the request,) or it can be textual (e.g., the list of details of the package in route to its destination.) The service subscribes to the user's presence. The service sends the results back to the user when it notices the users presence's status allows sending the details in the preferred format.

The inventive systems also allow services to incorporate commands that can be fulfilled at either the mobile terminal 100 (e.g., initiate a phone call) or at the server complex 204 (possibly in conjunction with other services in the network), or some combination thereof. For example, an individual chatting with another user may at some point wish to initiate a phone conversation. Preferably, the user requests the server complex 204 to initiate a phone conversation by sending a command from the mobile terminal 100 to the server complex 204 comprising at least the information needed to establish a phone call between the sender and the target recipient. The server complex 204 initiates a request to a Voice Over IP (VoIP) telephony system. That system then establishes the closest telephony access points to the end points and sets up a call by calling back the sender and the target user routing the calls between those access point using such common protocol as Session Initiation Protocol (SIP) and Real-Time Transport Protocol (RTP). The system may use a chatting interface to collect and establish the details of the call (as described earlier) or it may collect the information and initiate a command using common techniques known to those with ordinary skill in the art. In an alternative embodiment, the server complex 204 sends a command back to the mobile terminal 100 comprising at least the target's phone number. The mobile terminal 100 then initiates a telephony call with the target. Conventional techniques may be used to establish a phone call at the mobile terminal 100.

The quality characteristics of connections over wireless data networks can change with time. For example, a mobile user can move into a no coverage area where the data connection is dropped. The connection can be re-established later when coverage is available again, however, in the process the mobile terminal 100 may acquire a new IP address. Consequently, the server complex 204 is left unable to forward messages to the mobile terminal 100. To deal with this, the system disclosed herein uses a session identifier to describe the connection between a particular mobile terminal 100 and the server complex 204. Whenever a mobile terminal re-establishes a connection (after losing it due to loss of coverage, as an example) the mobile terminal 100 re-uses the session id of the interrupted session. The server complex 204 then rebinds the new connection to the existing session. If the mobile terminal 100 does not reconnect within a given timeout period, the server complex 204 can terminate the session. Other events causing a disconnection can include a lost session termination command sent from the mobile terminal 100, improper shut down of the chat application at the mobile terminal 100, battery failure, and the like.

Preferably, all routing that occurs within (or among) server complexes 204 is done using the session ids. A session id is preferably used instead of a client id because a user may choose to terminate a session and establish another. In this manner, all messages bound to the terminated session may be removed from the system. Only transactions associated the active sessions are maintained. Also, in a distributed server complex 204 environment where there are many message broadcasters 303 (i.e. physical server hosts), the client may attach to different hosts servers. Using session ids provides a simple means to find where the client is currently connected. In addition, on re-establishing a connection, the server complex 204 can use what is commonly known in the art as sticky load-balancing switches that direct a re-connecting client to physically re-establish its connection with its previous host server based on the session id (even in cases where the IP address of the mobile terminal 100 may have changed.)

In addition, many wireless operator networks do not allow unsolicited network-initiated messages to reach the mobile terminal 100. Network-initiated messages, as they pertains to the systems described herein are messages going from the server complex 204 toward the mobile terminal 100 that appear to the network operator as if it was unsolicited by the mobile terminal 100. This is a common problem in chatting environments since a message broadcaster 303 commonly sends unsolicited inbound messages 500 to the recipients of a message. To overcome this, the system uses keep-alive strategies. These strategies vary depending on the data transfer protocol established between the particular mobile terminal 100 and the server complex 204. The keep-alive strategies involve periodically sending a message from the mobile terminal 100 to the server complex 204. The keep-alive message appears to the mobile network as a request. Subsequent messages sent back to the mobile terminal 100 can then be considered by the operator as responses to requests as long as the messages sent to the mobile terminal 100 originate from the same address the mobile terminal 100 sent the keep alive message to. The frequency of the keep-alive messages is a matter of design choice and transfer protocol used. When HTTP is used as the transfer protocol, the system uses a polling mechanism. Using this mechanism, the keep-alive message is sent frequently and acts as a poll to determine if there are any pending messages at the server complex. If there are pending messages, those messages are sent back as a response to the polling request. TCP and or UDP do not require a polling mechanism and can use keep-alive techniques, such as simply sending at least the session id in a message to the server complex 204 with a significantly longer time between messages. Sending keep-alive messages may be optimized. For instance, the keep-alive messages do not have to be sent when outbound messages 400 have been recently sent from the mobile terminal 100 to the server complex 204.

Preferably, all messages sent to the mobile terminal 100 from the server complex 204 go through the same router and possibly the same physical host server that the mobile terminal 100 attaches to in the server complex 204. This ensures that the operators can treat the messages as responses to a mobile terminal's 100 requests. Other techniques to make traffic appear to originate from the same location, such as address mapping and the like can also be used by the system.

In addition, keep-alive messages work in conjunction with other techniques described above to inform the chat server complex 204 if the address of the mobile terminal has changed. This is especially useful in cases where UDP is used as the transport protocol. On every keep-alive message sent, the server complex 204 notes the address of the mobile terminal 100. If the address changed, the server complex 204 then rebinds the session id to the new address. As such, the keep-alive message may still benefit the system even if the operator does not block network-initiated messages.

It is possible that the server complex 204 is unable to deliver a message to a mobile terminal 100 because it doesn't have the most up-to-date address—the address of the mobile terminal 100 may have changed before a keep-alive message is sent. In this situation, the system may, for example, hold on to the undelivered message for a period until the next keep-alive message arrives; it may drop the message and inform the sender that it failed to send the message; or it may send the message using some out-of-band mechanism, such as the out-of bad mechanism described in connection with FIG. 15.

A problem in some currently deployed wireless packet data networks is communication channel resource contention. While a wireless data connection is established, some systems (e.g., CDMA's 1xRTT) can loose the capability to route telephony calls and other wireless related services to the mobile terminals 100. As such, the keep-alive strategy used by the system described above can become problematic. To solve this problem, the preferred embodiment uses a back-off strategy that is based on predicting the user's involvement in the chatting service. The back-off strategy uses a dynamic timeout scheme. For example, when the mobile terminal 100 is presenting a chat history display where there are active updates (i.e., inbound messages 500) and the likelihood if participation is high, the length of timeout is significantly longer than when there are no updates or when the mobile terminal 100 is presenting a buddy list display and the likelihood pf participation is lower. The purpose of the timeout is to guard against cases where the user might have forgotten or otherwise inadvertently left the chatting application running preventing any incoming telephony calls or other communications from reaching the user. When a timeout occurs, the user is given the opportunity to continue the session. A prompt notifying the user that the connection between the mobile terminal 100 and the server complex 204 is about to be severed. The user can choose to cancel the action and keep the connection alive. Otherwise, if the user doesn't cancel within the allotted time to respond, the connection is automatically terminated. When the mobile terminal is disconnected, it can no longer receive chat messages through the previously established packet data connections.

Alternative disconnect schemes can be used. For example, the chatting program running on the mobile terminal may choose to periodically reconnect with the server complex 204 to see if there are any messages pending delivery. If not, the chatting program on the mobile unit may automatically disconnect. Otherwise, the messages are delivered and the program updates the chat history display as described above and resumes operations until either the user terminates the session or a timeout occurs as described above.

Figure 15:
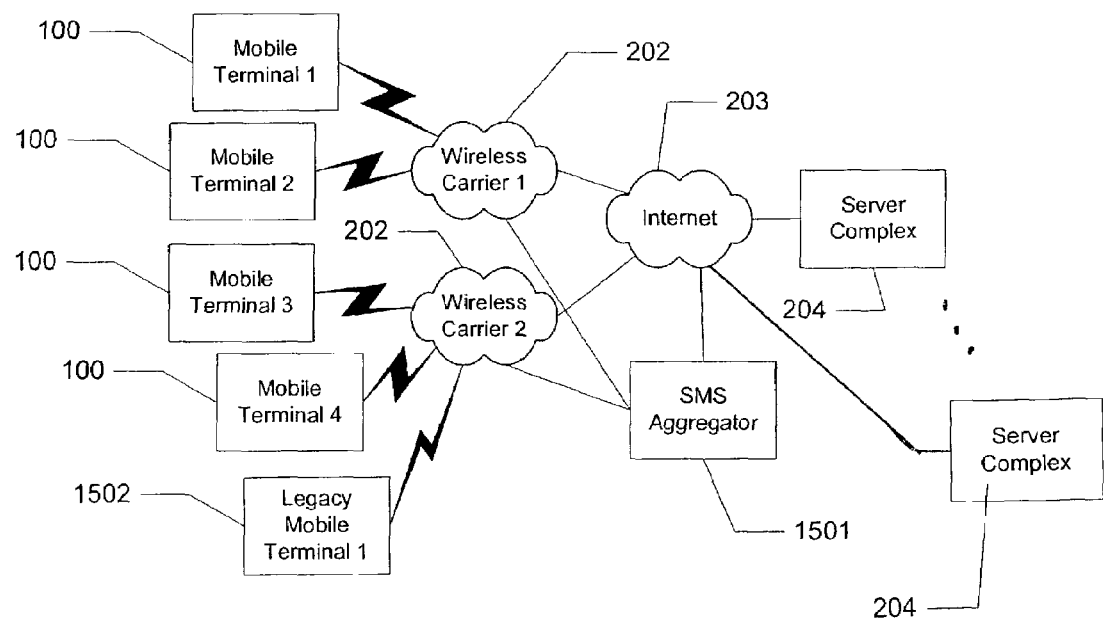
FIG. 15 is a block diagram of a wireless communications system that has been extended to integrate legacy mobile terminals in accordance with a further embodiment of the present invention.

FIG. 15 illustrates how the overall system architecture of a wireless communication system comprising the elements described in FIG. 2 is extended to integrate with a legacy mobile terminal 1502. Within the context of the systems described herein, a legacy mobile terminal 1502 is capable of transmitting and receiving at least text messages over some well-established conventional mechanism, such as Short Messaging Service (commonly referred to in the art as SMS messages or simply SMS.) However, unlike a mobile terminal 100, the legacy mobile terminal 1501 lacks the elements required to communicate directly with the chat server complex 204 and or to directly participate in any chatting transactions described herein.

To integrate a legacy terminal, the chat server complex 204 communicates with at least one SMS aggregator 1501 via the communication network 203 (such as the Internet or World Wide Web). The SMS aggregator 1501, which can be a commercially-available device, comprises all those elements needed to allow entities that may not have any direct affiliation with wireless carriers to inject SMS messages into at least one wireless carrier network 202. The SMS aggregator 1501 takes as input (via its interfaces to the communication network) a description of the SMS. The description comprises all the elements needed to send a message to the target mobile terminal 100. The description comprising at least the originator's address, such as a mobile terminal's 100 address, or a special return address known as a short code or a long code, the destination address, such as a terminal 100 address, and the content of the message.

The SMS aggregator 1501 communicates with the target operator via its wireless carrier network 202 interfaces and injects an SMS on behalf of the requester. In this system, the requestor is the chat server complex 204 or any agents acting on its behalf.

The mobile terminal 100 allows a user to enter the address of a legacy mobile terminal 1502. This can be done in an ad-hoc fashion where the user is prompted for the address at the time of creating the outbound message 400. The address in this context is typically the telephone number of the mobile terminal 1502. Alternatively, for a user frequently targeting a particular legacy mobile terminal 1502, the system may provide that user means to build a buddy presence in the system comprising at least a presence data record 700 and a nickname data record 800. Conventional data collection and construction methods for the processes of adding a legacy buddy or using ad-hoc addressing, can be employed.

The legacy address, be it the actual address or a recipient's id of legacy buddy, can be used in the same manner as any other recipient id. It is placed in the list of recipient ids (403 and 502) in outbound messages 400 and inbound messages 500. In the case where the actual address is used, the address presentation is usually distinguishable from non-legacy addresses. That allows the system to process the address in a different manner than the remaining recipient ids.

The legacy address can be a part of a group communication with at least another legacy mobile terminal 1502 and at least another [non legacy] mobile terminal 100. Alternatively, the legacy address can be the only address supplied in a one-to-one communication with the legacy terminal. The legacy address can be part of initiating a new thread of conversation, or it can be part of a reply to an existing thread.

In the case of ad-hoc entry of legacy address, the system has to establish recipient fields (503–505) in inbound messages 500. The system may place generic representation in these fields. For example, it can use the address as the recipient's name 503. Where available, the system may query public address books to find the actual name. Other techniques may also be deployed. For example, in cases where the information is considered private and the system is not permitted to present it, the mobile terminal 100 (or the server complex 204) may replace the information with proxy representations.

The outbound message 400 carrying a legacy address is sent to the message broadcaster 303 in the chat server complex 204. The message broadcaster 303 detects the legacy address of the legacy mobile terminal 1502 (either the actual address or a reference to it using a legacy buddy recipient id). For each non-legacy mobile terminals 100, the message broadcaster 303 builds inbound messages 500 as described above herein.

For each of the target legacy terminals 1502, the broadcaster 303 sends an SMS request to the SMS aggregator 1501. To do this, the broadcaster 303 sets the originator address of the SMS request to the mobile address of the sender's mobile terminal 100 initiating the message. The SMS aggregator 1501 sends an SMS on behalf of the chat server complex 204 and the sending user to the legacy mobile terminal 1502.

The message sent to the legacy mobile terminal 1502 contains at least the original message. Other information can be included in the message. For example, the message may comprise the list of other recipients, the thread identification, the time of delivery, a service provider identity, an advertisement, or the like. In the case of a voice message that can not be delivered via the out-of-band messaging scheme, the chat server complex 204 can replace the voice content with textual content. Where speech-to-text service are available, the chat server complex 204 can place the derived text message whole or truncated. Otherwise, the chat server complex 204 can place a representation of the discussion. For example, it may drop the voice part and only send the text part similar to what is displayed on a chat history display when an inbound voice message is received.

Once the SMS is delivered to the recipient's legacy mobile terminal 1502, the SMS application native to the legacy mobile terminal 1502, which typically resides in an application storage and is executed on a CPU within terminal 1502 intercepts the SMS and notifies the user allowing the user to read the contents of the message. The recipient may respond to the message using the SMS application on the legacy mobile terminal 1502. In that case, the application builds a reply SMS that targets the sender using the originator address in the original inbound SMS that was supplied by the chat server complex 204. In this situation, the message does not go back to the chat server complex 204. Instead, the reply SMS goes directly to the target mobile terminal 100 via the wireless carrier's network 202. When the response reaches the target mobile terminal 100, the chat application, intercepts the message and displays it as part of the chat history display as described in FIG. 11) as inbound message.

Some mobile terminals do not allow the chat application to access the out-of-band messaging system. In that case, the user would either have to respond using the native out-of-band application, move the message (in part or in whole) between the two applications, or otherwise manage the message in the application.

Currently most SMS systems do not comprise the elements necessary to allow the chat server complex 204 to predictably embed any information that would manifest itself in an SMS response coming back from the legacy mobile terminal 1502 (such as a thread id, list of recipients, or the like.) As such, the reply SMS is not guaranteed to have any identification that would allow the chat application program on the mobile terminal 100 to bind the inbound message to an existing thread. As a result, the message may appear in the chat history display as a new message in a new thread. The client on the mobile terminal 100 under these conditions can generate the thread id on behalf of the legacy mobile terminal 1502. In the event the user replies, the new message and the legacy mobile terminal's 1502 address (i.e., the originator address of the reply SMS address) are sent to the chat server complex 204.

In an alternate embodiment, the chat server complex 204 does not place the sender's mobile address as the SMS originator address as described in the preferred embodiment. Instead, the chat server complex 204 uses a long code or alternatively, a short code. In this case, the SMS reply from the legacy mobile terminal 1502 goes back to the server complex 204. The chat server complex 204 can de-multiplex the messages from the legacy mobile terminals 1502 over of codes using various conventional techniques to bind a reply SMS to an existing thread. In this case, the message broadcaster 303 in the chat server complex's 204 can broadcast the message back to all the participants in the thread via the appropriate channels. For example, if another legacy mobile device was participating in the thread, the message broadcaster 303 could send the message via the SMS aggregator 1501 as described above herein.

The legacy integration role of the message broadcaster 303 can be performed at the mobile terminal 100 instead of in the chat server complex 204. In this case, the mobile terminal 100 does not use the SMS aggregator 1501. Instead, the mobile terminal 100 could inject the SMS directly into at least one wireless carrier network 202 for each of the targeted legacy mobile terminal(s) 1502.

Other out-of-band communication mechanisms can be used such as email, Multimedia Messaging Services (MMS), or the like. In such cases, other gateway forms replace the SMS aggregator 1501. Other delivery mechanisms may allow embedding other information in the reply message from the legacy terminal, further allowing the system to bind the replies to the existing threads.

A problem confronted by some mobile terminals 100 is loss of application context when the user initiates another, non-chat application on the terminal 100. For example, when a user on a mobile terminal 100 receives an incoming telephony call, the mobile terminal 100 may drop data connection resources, suspend or halt executing the chat program, and/or otherwise disable the chat application from communicating and fulfilling chat transactions with the chat server complex 204. In this case, the user may shutdown the chat application when there is little perceived activity or the chatting program may disconnect automatically to free up resources, as described above herein. As such, what was once considered a valid mobile terminal 100 for chatting according to the systems disclosed herein may act in a manner indistinguishable from that of a legacy mobile terminal 1501. The techniques that are described above as methods to integrate the chat environment with legacy mobile terminals 1502 can be applied in these situations as well. The out-of-band delivery of messages (via SMS for example) acts as a hailing to the user. It informs the recipient that a chat thread is in progress. The user may then choose to re-activate the chat program and resume the chat conversation. Alternatively, if resumption is not possible or convenient, the user may still chose to participate using the available out-of-band mechanism. In cases where the chatting application has access to the incoming out-of-band message, the chatting application on the mobile terminal 100 many extract the content and place them in the chat history display. It may also allow the recipient to reply to the sender. The reply may go back as an out-of-band message or it may go through the chatting system as an outbound message 500 band through the chat systems disclosed herein.

The presence status 702 represented on the mobile terminal 100 by presence status indicators 904 and 911 describes what is referred to as availability. Availability in such contexts indicates that a user is able to receive inbound messages 500 (and optionally the type of inbound messages 500.) A status that indicates lack of availability in such contexts presents the fact that a user is unable to receive inbound messages 500 (or a particular type thereof). As such, either the system will drop messages targeting the unavailable user, or it will store the messages for some time until the user is available again. For example, the system may always attempt to deliver the message (even to legacy mobile terminals 1502). In addition, the availability (as defined by the current art) of legacy mobile terminals 1502 may not be determinable. Furthermore, it could be argued that the usefulness of availability (as defined by the current art) is somewhat diminished in cases where the mobile terminal 100 (and 1502) accompany the user the majority of time.

The presence status 702 can implement availability as defined above. In addition, the systems use presence status 702 and presence status indicators 904 and 911 to communicate other information, such as message delivery type. To accomplish this, the user on the mobile terminal 100 is presented with a representation of the means the system will likely use to deliver the message such as using in-band communications over the wireless packet data or through an out-of-band method such as SMS, email, or the like. It may also provide a representation of the subset or type of the messages that are likely be delivered. For example, an SMS-text-only representation can indicate that only the text portions of the message would likely be sent via SMS to the target recipient. As such, any attachments (e.g., pictures) as well as any speech components of outbound messages 400 would likely be dropped or otherwise not delivered to the target recipient. Such representation is better suited to the mobile user. For example, it may communicate to the user the cost associated with the delivery of the message, the expected delays, and or quality of service.

What has been described above is merely illustrative of the application of the principles of the present invention. Other arrangements and methods can be implemented by those skilled in the art without departing from the spirit and scope of the present invention.

The invention claimed is:

1. A method for chat-based communications between a first wireless mobile terminal that includes a data messaging service client application for sending data messages in a data messaging service system and a second wireless mobile terminal that includes a chat client application for sending chat messages to a chat server complex, comprising:
   receiving at the chat server complex an outbound chat message from the chat client application of the second mobile terminal, the chat message including a first address corresponding to the first mobile terminal and message content entered by a user using the chat client application;
   detecting the first address;
   upon detecting the first address, the chat server complex building an inbound message that includes the message content of the chat message and an originator address recognized within the data messaging service system, the originator address designating the second mobile terminal as a recipient of any reply to the inbound message from the first mobile terminal;
   formatting the inbound message for transport through the data messaging service system;
   injecting the inbound message into the data messaging service system for delivery to the first mobile terminal;
   receiving the inbound message at the data messaging service client application of the first wireless mobile terminal;
   the data messaging service client application producing a reply message responsive to the inbound message, the reply message including message content entered by a user using the data messaging service client application;
   the data messaging service client application sending the reply message to the originator address;
   transferring the reply message from the first mobile terminal to the chat server complex over the data messaging service system;
   at the chat server complex, binding the reply message to a chat thread;
   transferring the bound reply message from the chat server complex to the chat client application executing on second mobile terminal; and
   receiving at the second mobile terminal at least the message content included in the reply message.

2. The method of claim 1, further comprising:
   directly transferring the reply message, by way of the data messaging service system, from the first mobile terminal to a data messaging service client application executing on the second mobile terminal.

3. The method of claim 1, wherein the chat thread involves at least one first mobile terminal and at least one second mobile terminal.

4. The method of claim 1, wherein the originator address is the address of the second mobile terminal.

5. The method of claim 1, wherein the originator address corresponds to the chat server complex.

6. The method of claim 5, wherein the originator address is selected from the group consisting of an SMS long code and an SMS short code.

7. The method of claim 1, wherein the outbound message includes content suitable for presentation at the first mobile terminal.

8. The method of claim 1, further comprising:
   sending the inbound message to an aggregator for injection into the data messaging service system.

9. A system for chat-based communications between a first wireless mobile terminal and a second wireless mobile terminal, comprising:
   a data messaging service client application, included in the first mobile terminal, for sending data messages in a data messaging service system;
   a chat client application, included in the second mobile terminal, for sending chat messages in a chat message system;
   a chat server complex, included in the chat message system, for receiving an outbound chat message from the chat client application of the second mobile terminal, the chat message including a first address corresponding to the first mobile terminal and message content entered by a user using the chat client application, the chat server complex including:
   means for detecting the first address; and
   means for building an inbound message in response to detecting the first address, the inbound message including the message content of the chat message and an originator address recognized within the data messaging service system, the originator address designating the second mobile terminal as a recipient of any reply to the inbound message from the first mobile terminal;
   means for formatting the inbound message for transport through the data messaging service system;
   means for injecting the inbound message into the data messaging service system for delivery to the first mobile terminal;
   means for receiving the inbound message at the data messaging service client application of the first wireless mobile terminal, wherein the data messaging service client application produces a reply message responsive to the inbound message, the reply message including message content entered by a user using the data messaging service client application;
   means for sending the reply message from the data messaging service client application to the originator address;
   means for transferring the reply message from the first mobile terminal to the chat server complex;
   means for binding the reply message to a chat thread;
   means for transferring the bound reply message from the chat server complex to the chat client application executing on the second mobile terminal; and
   means for receiving at the second mobile terminal at least the message content included in the reply message.

10. The system of claim 9, further comprising:
    means for directly transferring the reply message, by way of the data messaging service system, from the first mobile terminal to a data messaging service client application executing on the second mobile terminal.

11. The system of claim 9, wherein the originator address is the address of the second mobile terminal.

12. The system of claim 9, wherein the originator address corresponds to the chat server complex.

13. The system of claim 12, wherein the originator address is selected from the group consisting of an SMS long code and an SMS short code.

14. The system of claim 9, wherein the injecting means includes an aggregator.

15. The system of claim 9, further comprising:
means for sending the reply message to a plurality of wireless mobile terminals participating in the same group chat thread as the first and second mobile terminals.

16. A system for integrating into a wireless chat service a first wireless mobile terminal that includes a data messaging service client application for sending data messages in a data messaging service system, comprising:
- a chat client application, executable on a second wireless mobile terminal, for sending and receiving chat messages;
- a chat server for receiving an outbound chat message from the chat client application executing on the second mobile terminal, the chat message including a first address corresponding to the first mobile terminal and message content entered by a user using the chat client application, the chat server complex including:
- means for detecting the first address; and
- means for building an inbound message in response to detecting the first address, the inbound message including the message content of the chat message and an originator address recognized within the data messaging service system, the originator address designating the second mobile terminal as a recipient of any reply to the inbound message from the first mobile terminal;
- means for formatting the inbound message for transport through the data messaging service system and for injecting the inbound message into the data messaging service system for delivery to the first mobile terminal;
- means for receiving a reply message from the first mobile terminal at the chat server complex, the reply message produced by the data messaging service client application in response to receiving the inbound message, the reply message being sent from the data messaging service client application through the data messaging service system to the originator address;
- means for binding the reply message to a chat thread; and
- means for transferring the bound reply message from the chat server complex to the chat client application executing on the second mobile terminal.

17. The system of claim 16, wherein the data messaging service system supports a service selected from the group consisting of Short Messaging Service (SMS), Multimedia Messaging Service (MMS), email, and Internet messaging (IM).

18. The system of claim 16, wherein the originator address is selected from the group consisting of an SMS long code, an SMS short code and the second mobile terminal address.

* * * * *